(12) United States Patent
Uchida (10) Patent No.: US 6,343,144 B2
(45) Date of Patent: *Jan. 29, 2002

(54) METHOD AND APPARATUS FOR IMAGE PROCESSING, AND STORAGE MEDIUM

(75) Inventor: Yoshiki Uchida, Irvine, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,565

(22) Filed: Jan. 22, 1998

(30) Foreign Application Priority Data

Jan. 23, 1997 (JP) .............................................. 9-010309

(51) Int. Cl.$^7$ ................................................ G06K 9/00
(52) U.S. Cl. ...................................... 382/162; 382/305
(58) Field of Search ................................ 382/162, 167, 382/305, 260, 266; 358/500, 501, 502, 515, 518, 521, 527, 474, 400, 401, 296, 301, 302, 487; 355/18, 124, 55; 359/3, 17, 31; 348/96–100, 273, 279, 345

(56) References Cited

U.S. PATENT DOCUMENTS

| 5,077,605 | A | * | 12/1991 | Ikeda et al. ..................... 358/75 |
| 5,218,392 | A | * | 6/1993 | Sakamoto et al. ........... 354/106 |
| 5,258,859 | A | * | 11/1993 | Wada et al. ................. 358/487 |
| 5,260,732 | A | * | 11/1993 | Goto et al. .................. 354/105 |
| 5,335,082 | A | * | 8/1994 | Sable .......................... 358/350 |
| 5,404,196 | A | * | 4/1995 | Terashita et al. .............. 355/77 |
| 5,508,825 | A | * | 4/1996 | Kataoka ...................... 358/474 |
| 5,668,881 | A | * | 9/1997 | Kurita et al. ................. 380/51 |
| 5,703,701 | A | * | 12/1997 | Yamamoto et al. ......... 358/487 |
| 5,748,287 | A | * | 5/1998 | Takahashi et al. ............ 355/40 |

* cited by examiner

*Primary Examiner*—Leo Boudreau
*Assistant Examiner*—Kanji Patel
(74) *Attorney, Agent, or Firm*—Fitzpatrick, Cella, Harper & Scinto (57) ABSTRACT

An image processor in which image information is read from a recording medium, such as a film used in a camera, with color-processing or filter-processing being efficiently performed in accordance with the contents of the image information. Focus information is also recorded on the recording medium by a method different from the method used for recording the image information. Using the focus information, the image processor suitably switches operation between color processing and filter processing.

26 Claims, 9 Drawing Sheets

TECHNIQUE OF DETERMINING THE UNDER-COLOR LEVEL (R) FROM HISTOGRAM

| INPUT | | OUTPUT | | |
|---|---|---|---|---|
| COL | Dis | UCR | FILTER | SEN |
| 1 (BLACK) | 0 | 0 | 0 | 1 |
| | 1 | 1 | 1 | 1 |
| | 2 | 2 | 2 | 1 |
| | 3 | 3 | 2 | 1 |
| 0 (COLOR OTHER THAN BLACK) | 0 | 3 | 0 | 1 |
| | 1 | 3 | 1 | 1 |
| | 2 | 3 | 2 | 1 |
| | 3 | 3 | 2 | 1 |

FIG. 9

METHOD AND APPARATUS FOR IMAGE PROCESSING, AND STORAGE MEDIUM

BACKGROUND OF THE INVENTION

1. Field of the Invention

The present invention relates to an image processing apparatus and an image processing method in which image information is read from a recording medium and image processing is suitably performed in accordance with the read image information. The invention also pertains to a storage medium in which the above method is stored.

2. Related Background Art

Hitherto, the following type of film scanner is known: image information is read from a developed negative or positive film by the scanner and is output to, for example, a printer. The above type of film scanner has an image processing section for processing the read image information. Before the image processing section performs image processing on the read image, it is necessary to check the characteristics of the image. This further requires that an image should be first read from a film and then analyzed.

In order to overcome the above drawback, an image pick-up apparatus is known which is able to record on the surface of the film various types of information, such as photographic conditions, concerning a photographed picture. By using a film in which a picture (image) is recorded by the above type of image pick-up apparatus, the characteristics of the picture are obtained merely by reading information, such as photographic conditions, recorded on the film without needing to read the picture from the film and extracting its characteristics.

SUMMARY OF THE INVENTION

Accordingly, in view of the above background, it is an object of the present invention to efficiently perform color-processing of an image recorded on a recording medium by using focus information concerning the focus of the image when the image is taken, the image and the focus information being recorded on the recording medium by different methods.

It is another object of the present invention to efficiently perform filtering-processing on an image recorded on a recording medium by using focus information concerning the focus of the image when the image is taken, the image and the focus information being recorded on the recording medium by different methods.

In order to achieve the above objects, according to one aspect of the present invention, there is provided an image processing apparatus comprising: first reading means for reading an image recorded on a recording medium; second reading means for reading focus information concerning the focus of the image when the image is taken, the image and the focus information being recorded on the recording medium by using different methods; and color-processing means for color-processing the image read by the first reading means in accordance with the focus information read by the second reading means.

According to another aspect of the present invention, there is provided an image processing method comprising: a first reading step of reading an image recorded on a recording medium; a second reading step of reading focus information concerning the focus of the image when the image is taken, the image and the focus information being recorded on the recording medium by using different methods; and a color-processing step of color-processing the image read in the first reading step in accordance with the focus information read in the second reading step.

According to still another aspect of the present invention, there is provided a storage medium in which an image processing program is stored in such a manner that the program is readable by a computer, the program comprising: a first reading step of reading an image recorded on a recording medium; a second reading step of reading focus information concerning the focus of the image when the image is taken, the image and the focus information being recorded on the recording medium by using different methods; and a color-processing step of color-processing the image read in the first reading step in accordance with the focus information read in the second reading step.

According to a further aspect of the present invention, there is provided an image processing apparatus comprising: first reading means for reading an image recorded on a recording medium; second reading means for reading focus information concerning the focus of the image when the image is taken, the image and the focus information being recorded on the recording medium by using different methods; and filter-processing means for filter-processing the image read by the first reading means in accordance with the focus information read by the second reading means.

According to a further aspect of the present invention, there is provided an image processing method comprising: a first reading step of reading an image recorded on a recording medium; a second reading step of reading focus information concerning the focus of the image when the image is taken, the image and the focus information being recorded on the recording medium by using different methods; and a filtering step of filtering the image read in the first reading step in accordance with the focus information read in the second reading step.

According to a yet further aspect of the present invention, there is provided a storage medium in which an image processing program is stored in such a manner that said program is readable by a computer, the program comprising: a first reading step of reading an image recorded on a recording medium; a second reading step of reading focus information concerning the focus of the image when the image is taken, the image and the focus information being recorded on the recording medium by using different methods; and a filtering step of filtering the image read in the first reading step in accordance with the focus information read in the second reading step.

Further objects, features and advantages of the present invention will become apparent from the following description of the preferred embodiments with reference to the attached drawings.

DETAILED DESCRIPTION OF THE PREFERRED EMBODIMENT

A preferred embodiment of the present invention is described in detail below with reference to the accompanying drawings.

Figure 1:
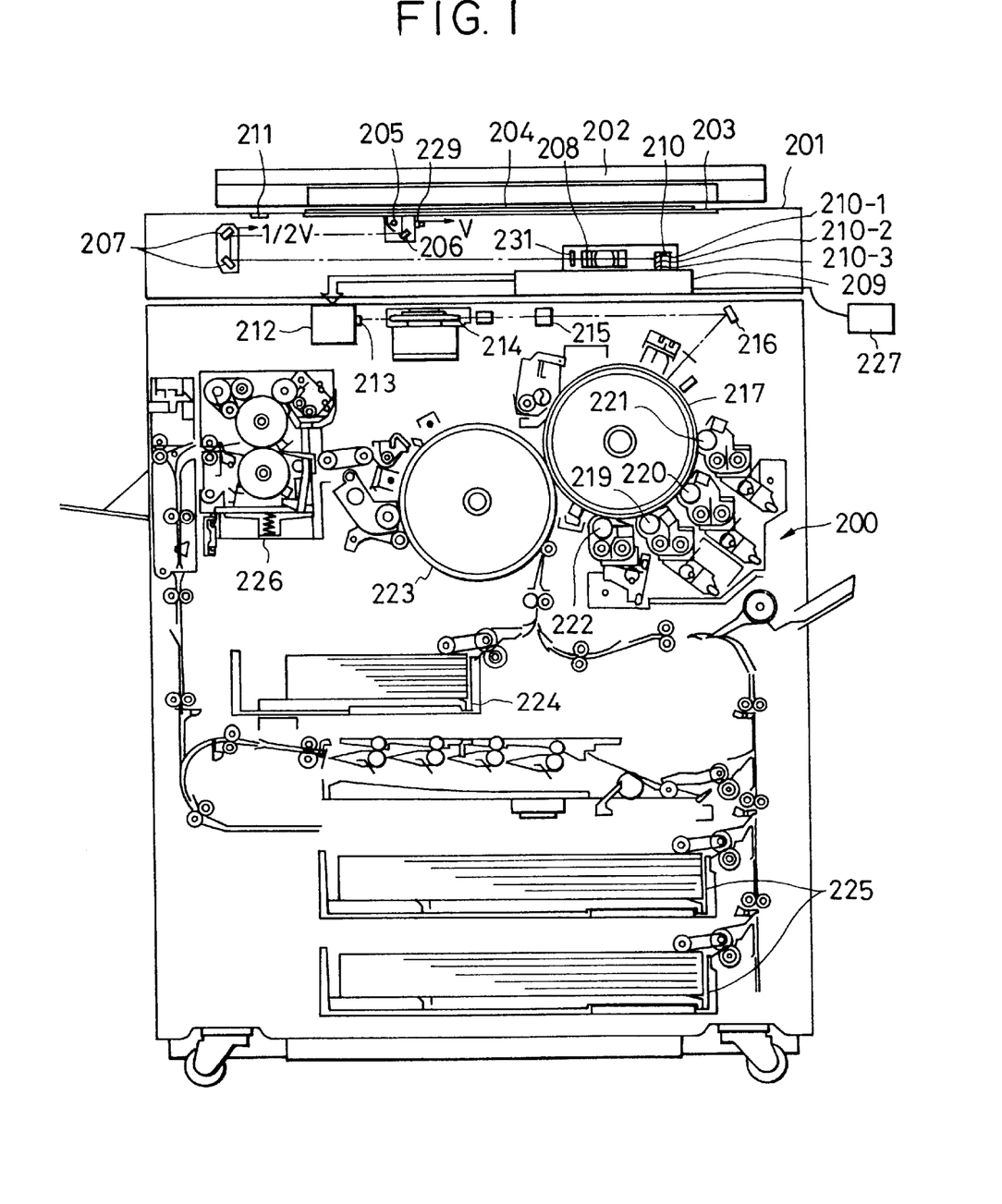
FIG. 1 is a schematic view illustrating a configuration of an image processing apparatus according to an embodiment of the present invention.

FIG. 1 is a schematic sectional view of an image processing apparatus according to a preferred embodiment of the present invention. In FIG. 1, the image processing apparatus has an image scanner 201 and a printer 200. The image scanner 201 reads a document or a film and converts an image signal corresponding to the read image to a digital signal. The printer 200 prints in full color on a sheet of paper an image corresponding to the image signal digitized by the scanner 201.

The configuration of the image scanner 201 is as follows.

In order to read an image of an original document 204 placed on an original-document glass (platen) 203, the document 204 held on the glass 203 by a document press plate 202 is exposed to light from a halogen lamp 205. The light reflected by the document 204 is transmitted to mirrors 206 and 207, and an image is formed on a three-line sensor (hereinafter referred to as "the CCD") 210 by a lens unit 208. The lens unit 208 is provided with an infrared-blocking filter 231.

The CCD 210 performs color separation on the light reflected from the document 204 and extracts color elements, such as red (R), green (G), and blue (B), of full color information and sends them to an image signal processing unit 209. The sensor arrays of the CCD 210 for reading the color elements are each formed of 5000 pixels. In this manner, the width (297 mm) of an A3-size document, which is the maximum size placable on the document glass 203, can be read with a 400-dpi resolution.

The halogen lamp 205 and the mirror 206 are moved at a velocity V, while the mirror 207 is shifted at a velocity 1/2 V, in the directions indicated by the arrows shown in FIG. 1. In this fashion, the halogen lamp 205 and the mirrors 206 and 207 are mechanically moved in the perpendicular direction (hereinafter referred to as "the sub-scanning direction") in relation to the CCD 210 in the electrical scanning direction (hereinafter referred to as "the main scanning direction), thereby scanning the overall surface of the document 204.

A standard white plate 211 is used for obtaining corrected data for the read data output from the R, G and B sensors 210-1, 210-2 and 210-3 of the CCD 210. The standard white plate 211 exhibits substantially uniform reflection characteristics in response to visible light. In this embodiment, the image data output from the R, G and B sensors 210-1 through 210-3 is corrected by utilizing the intensity of the light reflected by the white plate 211.

Figure 2:
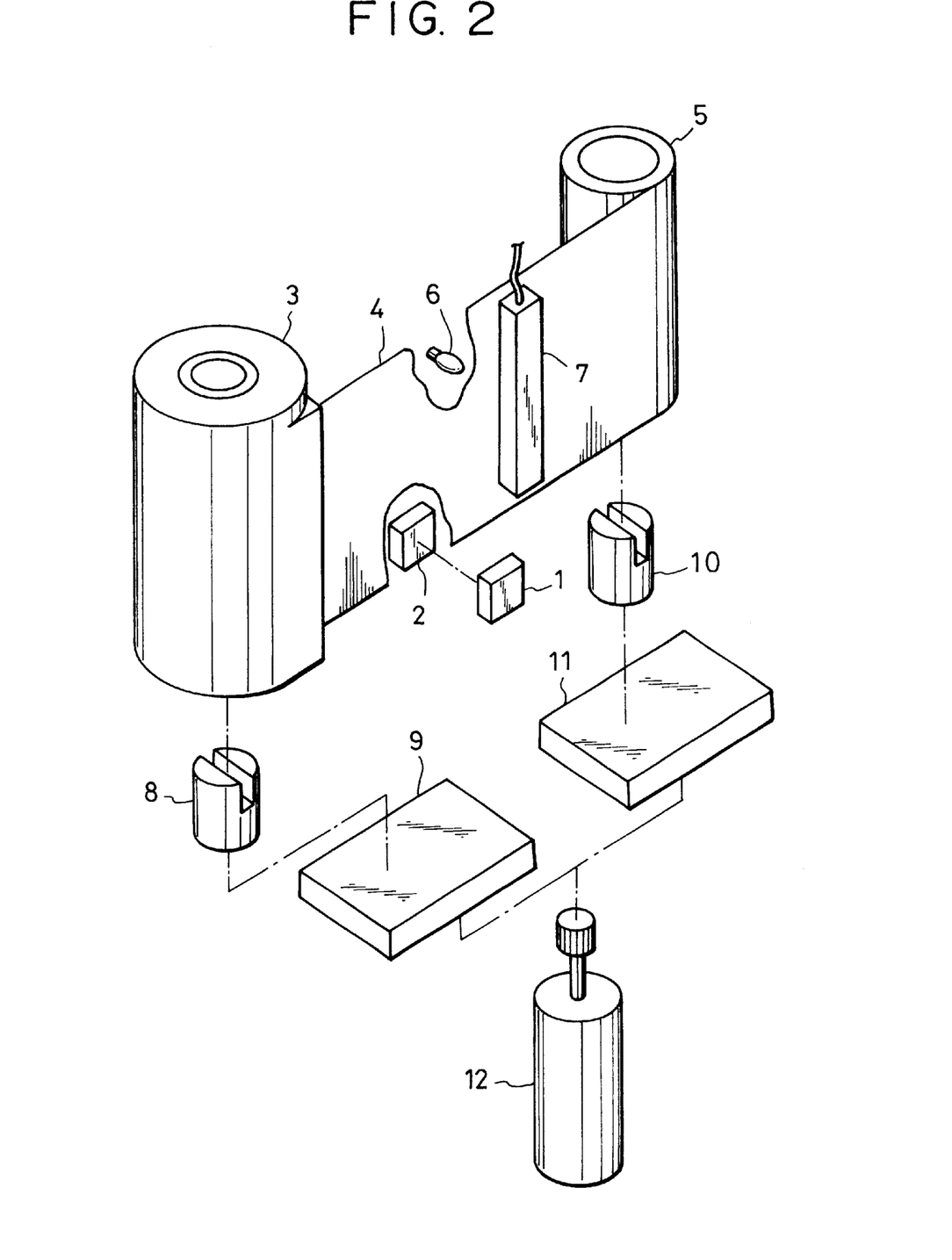
FIG. 2 is a schematic view illustrating a film scanner shown in FIG. 1.

The operation of reading an image signal and magnetic information from the film 4 with a film scanner 227 is described below.

FIG. 2 is an exploded view illustrating the internal configuration of the film scanner 227. The film 4 used in this embodiment has an optical recording portion for optically recording a photographic picture and a magnetic recording portion for magnetically recording various photographic conditions (for example, auxiliary information concerning the focal length, the zoom magnification, and the aperture) when the picture is taken.

Referring to FIG. 2, a magnetic head 1 serves as reading means for reading the above magnetic recording (photographic data) portion. The film scanner 227 includes a hold pad 2 for holding the magnetic head 1, a film cartridge 3, a film 4, a spool 5 for winding the film 4, and an illuminating device 6 for a scanner 7. The scanner 7 has R, G and B-color line sensors and reads the picture recorded on the film 4 based on the light passing through the film 4. The film 4 is fed to relatively move the scanner 7 in the sub-scanning direction. A feeding gear unit 8 is used for feeding the film 4 from the film cartridge 3. A fork 10 is employed for driving the spool 5 to wind the film 4. The film scanner 227 further includes a feeding gear unit 9 and a spool driving gear unit 11. A feeding motor 12 is connected to both the feeding gear unit 9 and the spool driving gear unit 11.

In the film scanner 227 constructed as described above, the feeding motor 12 is operated to feed the film 4, and simultaneously, the photographic data magnetically recorded on the film 4 is read by the magnetic head 1. At this time, the scanner 7 also reads the image (developed image) recorded on the film 4.

A description is given below of the image signal processing unit 209 for receiving the image signal from the image scanner 201 or the film scanner 227.

Referring back to FIG. 1, the image signal processing unit 209 switches between an image signal obtained by reading the document 204 placed on the document glass 203 with the image scanner 201 and an image signal read from the film 4 with the film scanner 227. The selected image signal is then input and electrically processed in the image signal processing unit 209 so as to be separated into the respective color elements, such as magenta (M), cyan (C), yellow (Y), and black (Bk). The separated color elements are then output to the printer 200. When an image is printed from the image scanner 201, data concerning one of the color elements, M, C, Y and Bk, is output to the printer 200 by scanning a document one time (plane-sequential image formation), and the entire image contained in one sheet is printed in full color by scanning the document four times.

In the-printer 200, a semiconductor laser 213 is modulated by a laser driver 212 based on the image signals of the respective colors M, C, Y, and Bk which have been processed and sent from the image signal processing unit 209. Laser light output from the modulated semiconductor laser 213 reaches and scans a photosensitive drum 217 via a polygonal mirror 214, a f-θ lens 215, and a mirror 216. Thus, an electrostatic latent image corresponding to the input image signals is formed on the photosensitive drum 217.

A developer device is formed of a magenta developer unit 219, a cyan developer unit 220, a yellow developer unit 221, and a black developer unit 222. The four developer units 219 through 222 sequentially contact the photosensitive drum 217 to develop the latent image having the respective colors M, C, Y and Bk formed on the photosensitive drum 217 with the corresponding colors of toner. A transfer drum 223 takes up and winds a sheet of paper fed from a sheet cassette 224 or 225 so as to transfer the toner image developed on the photosensitive drum 217 to the sheet, thereby forming a color image on the sheet.

After the toner images having the respective four colors M, C, Y and Bk are sequentially transferred to the sheet, the sheet passes through a fixing unit 226 and is then discharged to the exterior of the image processing apparatus.

An explanation is given below of a density reproducing method used in the printer 200 of the image processing apparatus according to an embodiment of the present invention.

In the printer 200 of this embodiment, in order to precisely reproduce image density, a well-known pulse-width modulation (PWM) method is employed to control the activation time of the semiconductor laser 213 in accordance with the image density signal. In this method, the electrostatic latent image having an electric potential in response to the activation time of the semiconductor laser 213 is formed on the photosensitive drum 217. Then, the respective colors of toner by an amount according to the electric potential of the latent image adhere to the photosensitive drum 217 by the developer units 219 through 222, thereby developing the latent image. The developed image is then transferred to a transfer sheet wound around the transfer drum 223. The image density is thus reproduced.

Figure 3:
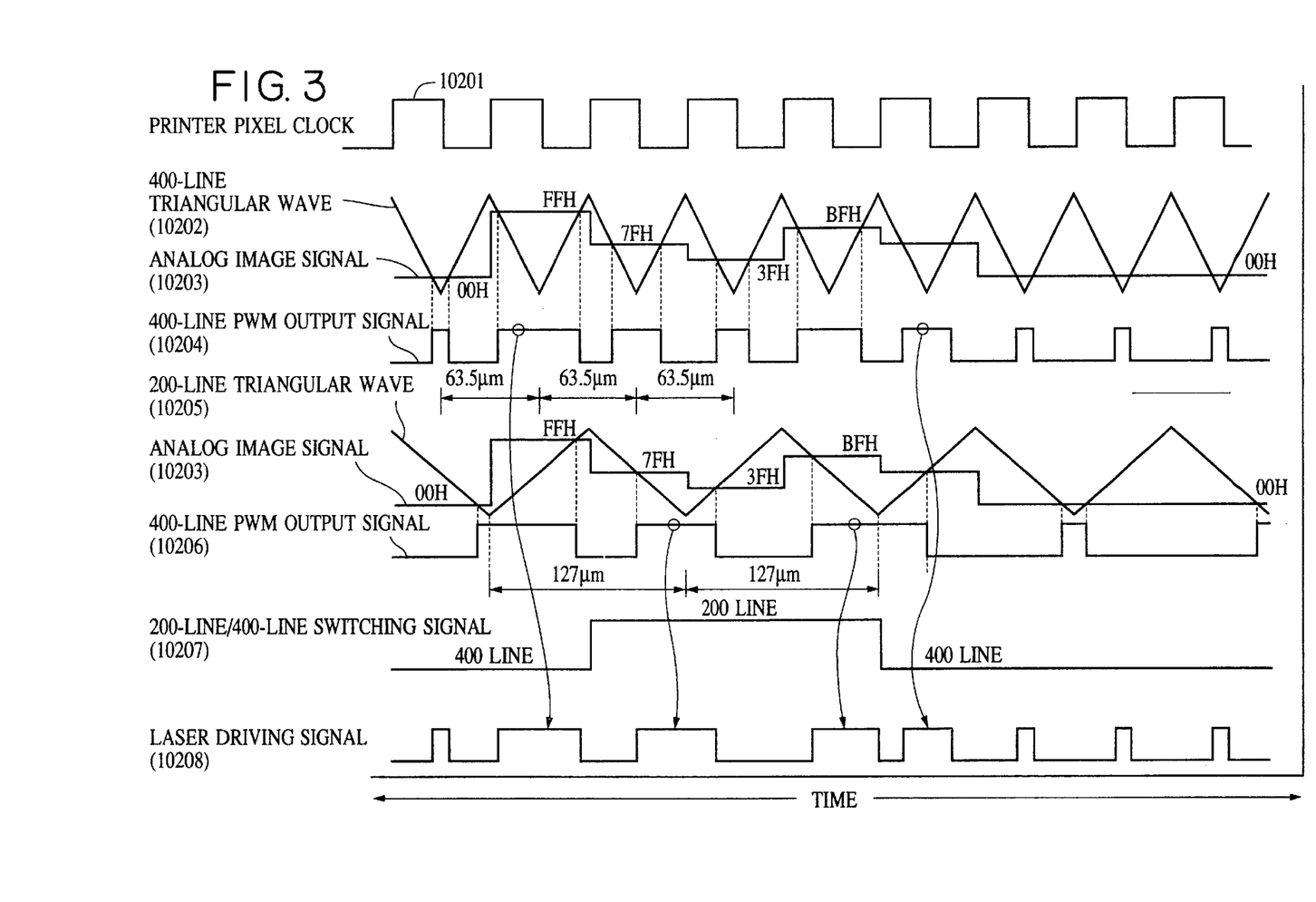
FIG. 3 is a timing chart illustrating the control timing provided to perform density reproduction in the printer shown in FIG. 1.

FIG. 3 is a timing chart illustrating the control operation for density reproduction performed in the printer 200.

In FIG. 3, 10201 indicates a printer pixel clock, which corresponds to 400-dpi resolution. The pixel clock 10201 is generated by the laser driver 212. Moreover, a 400-line (line/inch) triangular wave 10202 is produced in synchronization with the pixel clock 10201. The triangular wave 10202 and the pixel clock 10201 have the same period.

400-dpi resolution image data (digital) signals having the respective M, C, Y and Bk colors, each having a 256-step gradation (8 bits), and a 200-line/400-line switching signal are transmitted to the laser driver 212 from the image signal processing unit 209 in synchronization with the clock of the image data pixels. The laser driver 212 synchronizes the above signals with the pixel clock 10201 by using a FIFO memory (not shown). The image data having the respective colors, each having 8 bits, is converted into an analog image signal 10203 by a digital-to-analog (D/A) converter (not shown) and is compared with the above-described 400-line triangular wave 10202, thereby generating a 400-line PWM digital output signal 10204. This digital image data changes from "00H" (H indicates hexadecimal) to "0FFH", and thus, the 400-line PWM output signal 10204 has a pulse width in accordance with the above values. One period of the 400-line PWM output signal 10204 is 63.5 μm on the photosensitive drum 217.

Further, the laser driver 212 produces not only the 400-line triangular wave 10202 but also a 200-line triangular wave 10205, which has a period twice as long as the 400-line triangular wave 10202, in synchronization with the pixel clock 10201. Upon comparison of the 200-line triangular wave 10205 with the 400-dpi analog image signal 10203, a 200-line PWM digital output signal 10206 is generated. The 200-line PWM output signal 10206 forms a latent image on the photosensitive drum 207 with a period of 127 μm, as shown in FIG. 3.

Upon comparing density reproduction used by the 200-line triangular wave with density reproduction used by the 400-line triangular wave, a higher level of gradation reproducibility is achieved by the 200-line triangular wave because the minimum unit of the former wave for density reproduction is 127 μm, which is twice as long as the latter wave. In terms of resolution, however, the 400-line triangular wave that reproduces density by a 63.5 μm unit is more suitable for higher-resolution image recording. Consequently, 200-line PWM recording achieves a higher level of gradation reproduction, while 400-line PWM recording exhibits a higher level of resolution. To perform optimal density reproduction, therefore, PWM recording is switched between the 200-line triangular wave and the 400-line triangular wave in accordance with the nature of an image to be recorded.

For performing the above PWM switching operation, a 200-line/400-line switching signal 10207 is provided, as shown in FIG. 3. The switching signal 10207 is input for each pixel into the laser driver 212 from the image signal processing unit 209 in synchronization with the 400-dpi image data. When the 200-line/400-line switching signal 10207 is at a logical low level (hereinafter referred to as "the L level"), the PWM output signal using the 400-line triangular wave is selected. In contrast, when the switching signal 10207 is at a logical high level (hereinafter referred to as "the H level"), the PWM output signal using the 200-line triangular wave is selected.

Figure 4:
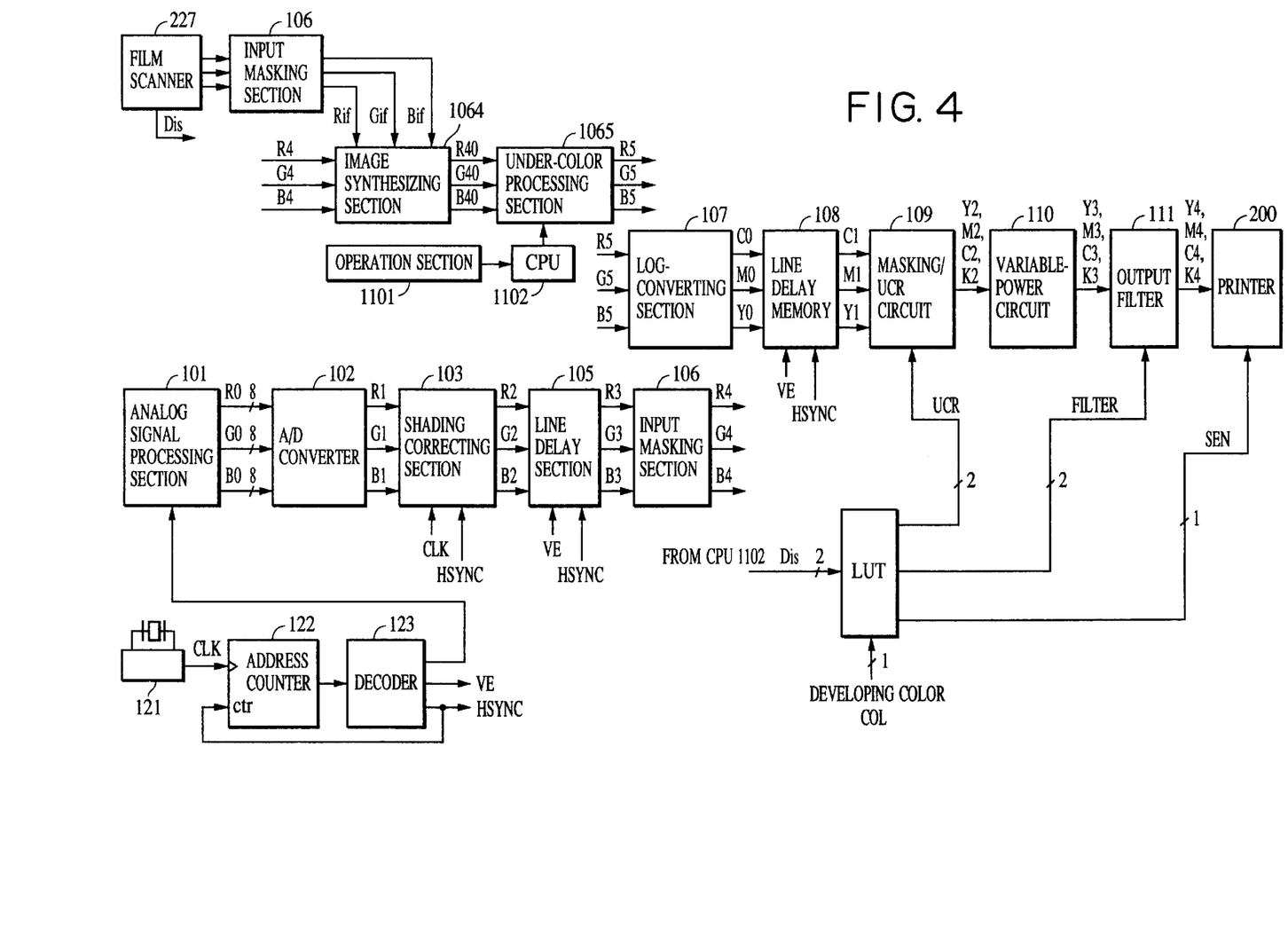
FIG. 4 is a schematic diagram illustrating the flow of an image signal in the image signal processing unit of the image scanner shown in FIG. 1.

The configuration of the image signal processing unit 209 of the image scanner 201 is as follows.

FIG. 4 is a block diagram illustrating the flow of an image signal in the image signal processing unit 9 according to an embodiment of the present invention. An image signal output from the CCD 210 is input into an analog signal processing section 101 of the image signal processing unit 209. In the analog signal processing section 101, the gain and the offset of the signal are adjusted. The corrected signal is then output to an A/D converter 102 in which the analog signal is converted into digital image signals R1, G1 and B1 of the respective colors, each having 8 bits. Subsequently, the image signals R1, G1 and B1 are input into a shading correcting section 103 in which the shading of each of the image signals R1, G1 and B1 is corrected according to a known shading correction method using a signal read from the standard white plate 211. The corrected signals R2, G2 and B2 are output.

Meanwhile, a clock generator 121 generates a clock (CLK) for each pixel. A main-scanning address counter 122 counts the number of clocks (CLK) from the clock generator 121 and generates a pixel address output signal for one line. A decoder 123 then decodes the main-scanning address output signal from the address counter 122 and produces the following signals: a CCD drive signal for each line, such as a shift pulse or a reset pulse, a VE signal representing the effective zone of a reading signal for one line output from the CCD 210, and a line synchronizing signal HSYNC. The address counter 122 is reset by the HSYNC signal output from the decoder 123 and starts counting the number of clocks output from the clock generator 121 for a subsequent line.

An input masking section 106 converts a reading color space, which is determined by the spectral characteristics of the R, G and B filters 210-1, 210-2 and 210-3 of the CCD 210, into an NTSC standard color space represented by R4, G4 and B4 according to the following matrix calculation.

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix}$$

An image synthesizing section 1064 respectively synthesizes the image signals R4, G4 and B4 output from the image scanner 201 with the image signals Rif, Gif and Bif which are output from the film scanner 227 via the input masking section 106. The calculations required for this synthesizing operation are as follows.

$$R40 = R4 \times \text{COMP } R + Rif \times (1-\text{COMP } R)$$

$$G40 = G4 \times \text{COMP } G + Gif \times (1-\text{COMP } G)$$

$$B40 = B4 \times \text{COMP } B + Bif \times (1-\text{COMP } B)$$

The elements COMP R, COMP G and COMP B are input by the operation performed through an operation section 1101 provided for the image processing apparatus. When all of the elements COMP R, COMP G and COMP B indicate "1", an image read by the image scanner 201 is output. In contrast, when all of the elements COMP R, COMP G and COMP B indicate "0", a film image read by the film scanner 227 is output. If the values between "0" and "1" are set in COMP R, COMP G and COMP B, an image signal from the image scanner 201 and a film image signal from the film scanner 227 are synthesized and output from the image synthesizing section 1064.

An under-color processing section 1065 detects and removes under-color components of the image signals R40, G40 and B40 output from the image synthesizing section 1064.

Figure 5:
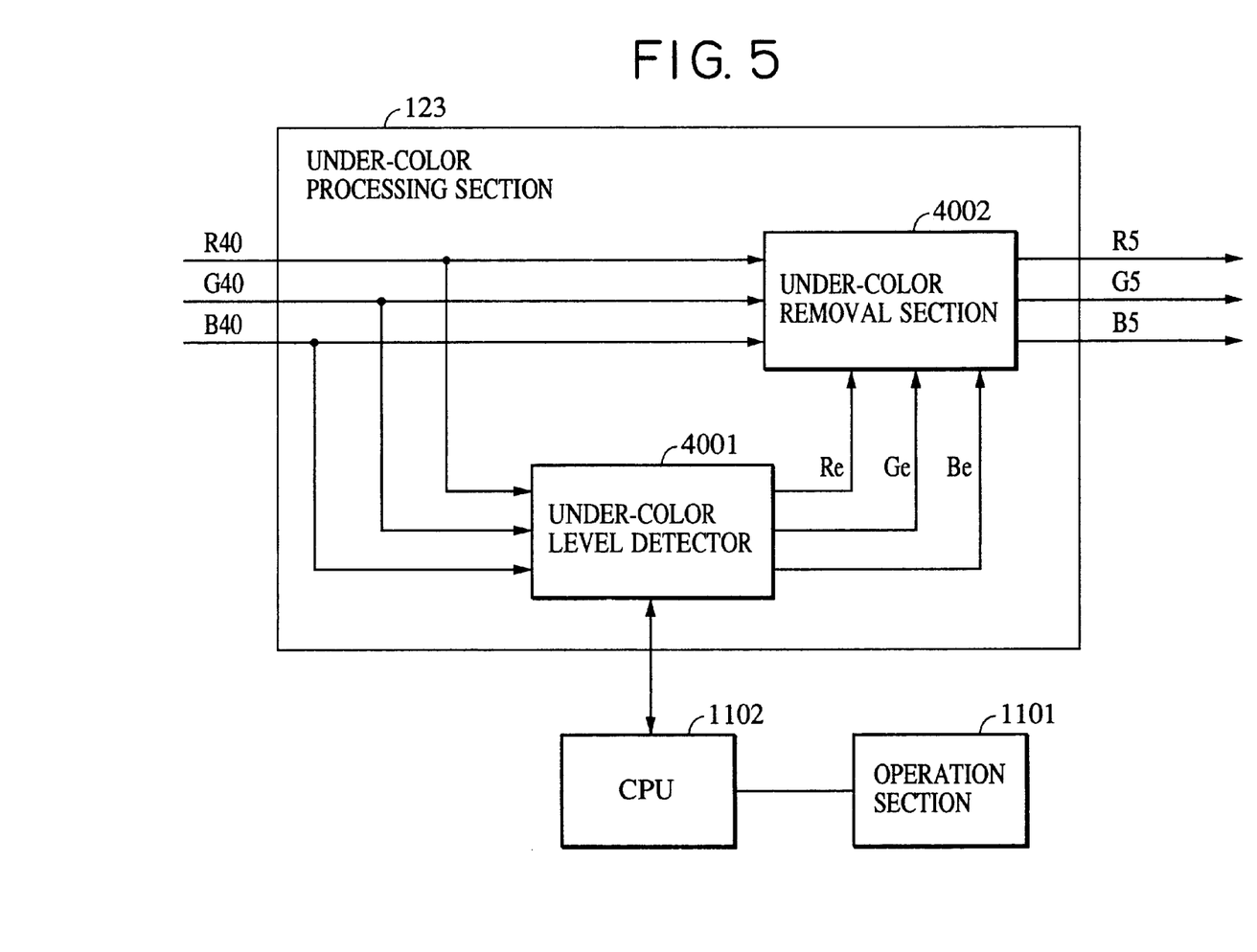
FIG. 5 illustrates the under-color processing section shown in FIG. 4.

FIG. 5 is a block diagram illustrating the configuration of the under-color processing section 1065 used in this embodiment.

In FIG. 5, when the operation section 1101 sets an AE mode signal representing the removal of the under-color components, the under-color level detector 4001 samples document image signals which are obtained during the prescanning of the image scanner 201, thereby producing density histograms of the respective image signals R40, G40 and B40. Then, according to the respective density histograms, the values of the respective image signals obtained by the following procedure are determined as under-color level signals Rb, Gb and Bb. The density levels higher than a predetermined value "α" and also having a greater frequency than a predetermined ratio are first obtained. Among the above values, the value having the highest density level is then determined.

Figure 6:
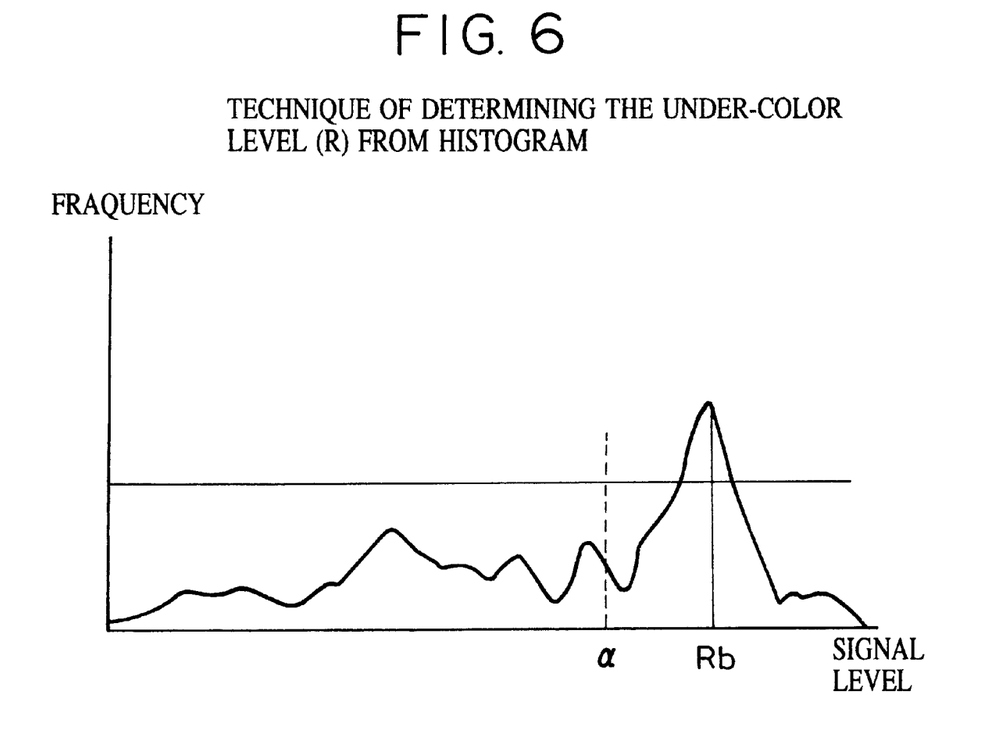
FIG. 6 is a diagram illustrating a technique of obtaining the under-color level from a density histogram.

An example of a technique of determining an under-color level signal Rb based on a histogram is shown in FIG. 6.

The under-color level signals Rb, Gb and Bb obtained by the under-color level detector 4001 are respectively converted into Re, Ge and Be according to the following equations and are input into an under-color removal section 4002.

$$Re = (255-Rb) \times 255 \times 255 / (Rb \times Gb \times Bb)$$

$$Ge = (255-Gb) \times 255 \times 255 / (Rb \times Gb \times Bb)$$

$$Be = (255-Bb) \times 255 \times 255 / (Rb \times Gb \times Bb)$$

In the under-color removal section 4002, the under-color components of the signals Re, Ge and Be are removed by performing a calculation using the following matrix equation, and the resulting signals R5, G5 and B5 are then output. It should be noted that the signals Re, Ge and Be required for this calculation are input from the under-color level detector 4001 during prescanning.

$$\begin{bmatrix} R5 \\ G5 \\ B5 \end{bmatrix} = \begin{bmatrix} 1 & 0 & 0 & Re \\ 0 & 1 & 0 & Ge \\ 0 & 0 & 1 & Be \end{bmatrix} \begin{bmatrix} R4 \\ G4 \\ B4 \\ R4 \times G4 \times B4 \end{bmatrix}$$

If the user manually instructs the adjustment of the under-color level through the operation section 1101, the signal indicating the adjusted level set by the user is input into the under-color level detector 4001 under the control of a CPU 1102. Then, the under-color level detector 4001 outputs the predetermined values corresponding to the input under-color levels of the respective colors as Re, Ge and Be to the under-color removal section 4002.

The above-described detecting operation by the under-color level detector 4001 may be performed using software according to the calculation based on the program of the CPU 1102.

Referring back to FIG. 4, a light quantity/density converting section (a LOG converting section) 107, which is formed of a look-up table (LUT) ROM, receives luminance signals R5, G5 and B5 output from the under-color processing section 1065 and converts them to density signals C0, M0 and Y0, which are then output to a line delay memory 108. The line delay memory 108 delays the density signals C0, M0 and Y0 for a predetermined number of lines. As a consequence, image signals C1, M1 and Y1 and the corresponding UCR signals with respect to the same pixel are simultaneously input into a masking/under color removal (UCR) circuit 109.

The masking/UCR circuit 109 extracts a black (K) signal from the three primary color signals C1, M1 and Y1 and further performs a calculation for correcting apparent contamination of recording color materials (toner) to be used in the printer 200. The resulting signals Y2, M2, C2 and K2, each having 8 bits, are plane-sequentially output every time the reading operation is performed by the image scanner 201.

A main-scanning variable-power circuit 110 enlarges and reduces the image signals Y2, M2, C2 and K2 in the main scanning direction by a known interpolation calculation and outputs the resulting signals Y3, M3, C3 and K3. Further, a spatial-filter processing section (output filter) 111 switches between edge enhancement and smoothing processing in accordance with a two-bit FILTER signal input from a LUT 117, which is described in detail later, and outputs the resulting signals Y4, M4, C4 and K4 to the printer 200.

The image signals Y4, M4, C4 and K4, and a SEN signal, which is a 200-line/400-line switching signal, are transmitted to the laser driver 212 of the printer 200. The signals are then pulse-width modulated (PWM) and are recorded by the printer 200.

Figure 7:
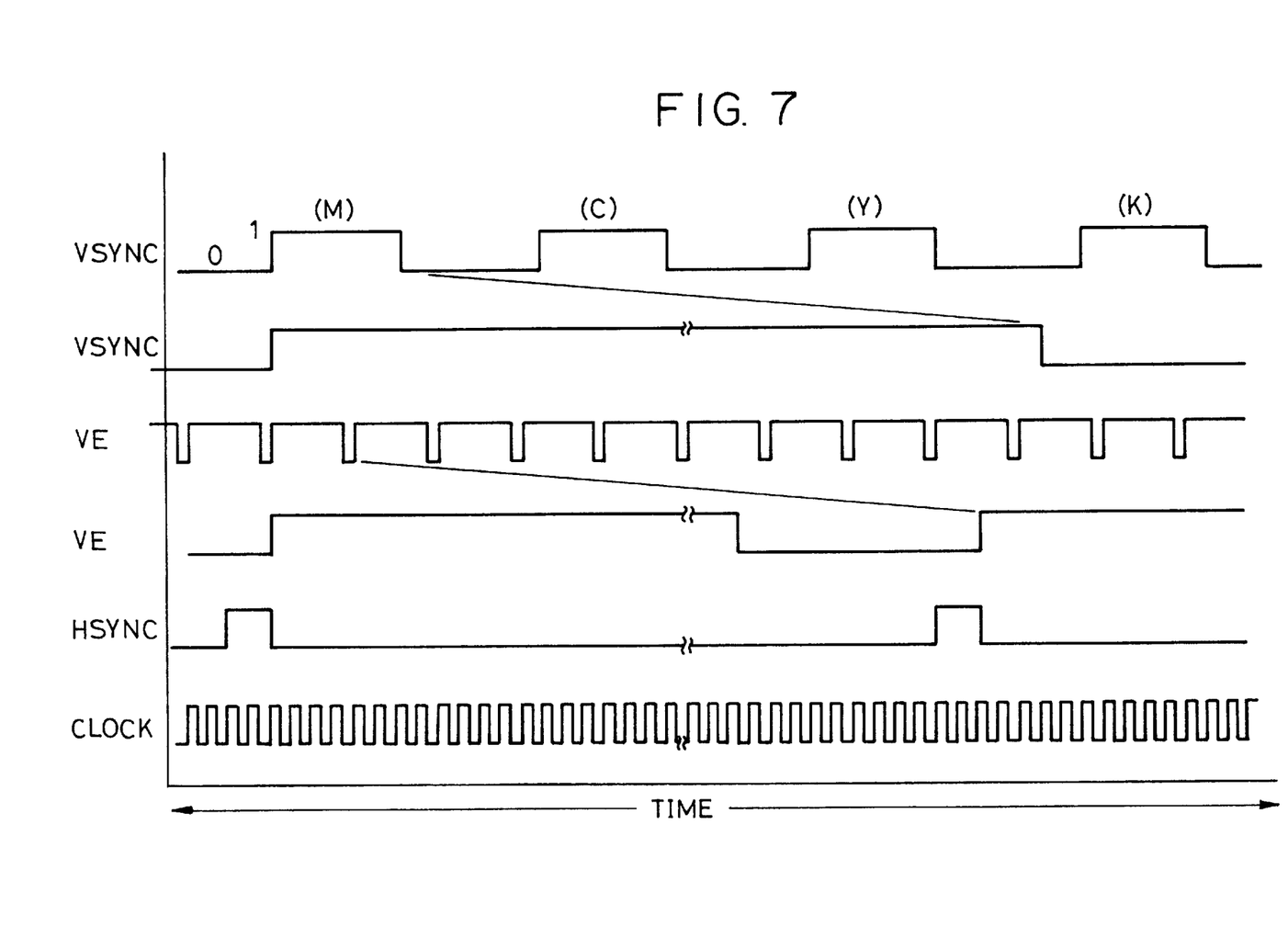
FIG. 7 is a timing chart illustrating the timing provided for the control signal used in the image signal processing unit shown in FIG. 4.

FIG. 7 is a timing chart illustrating the control signals used in the image signal processing unit 209.

In FIG. 7, a vertical synchronizing (VSYNC) signal represents the image effective zone in the sub-scanning direction. When the VSYNC signal indicates logical "1", the image reading (scanning) is performed and the output signals (M), (C), (Y) and (K) are sequentially output. A VE signal, representing the image effective zone in the main scanning direction, provides timing for starting the main scanning operation in the logical "1" zone and is primarily used for controlling the counting of the lines to be delayed. A CLOCK signal designates a pixel synchronizing signal used in the image scanner 201. When the CLOCK signal is at a rising edge timing "0"→"1", image data read by the CCD 210 is transferred and supplied to the signal processors, such as the A/D converter 102 used in the image signal processing unit 209. The CLOCK signal is also employed for transmitting the image signals and the 200-line/400-line switching (SEN) signal to the laser driver 212 of the printer 200.

A description is now given of the image processing executed on photographic data transmitted from the film scanner 227 according to an embodiment of the present invention.

When an image recorded on the film is read and input with the film scanner 227, photographic data concerning the input image signal is simultaneously read by the magnetic head 1. In this embodiment, as an example of the photographic data, the focal length determined during a photographic operation is described.

Based on the photographic data concerning the focal length, the subject of the image signal may be estimated as follows.

| | |
|---|---|
| Distant view | landscape |
| Middle view | portrait |
| Very close view | characters |

As a closer view is focused, the focus precision for the subject deteriorates. In view of this characteristic, the following adjustments may be made in order to perform the image processing considering the above correlations between the view and the subject.

1. When a distant view is focused, spatial filtering is performed so that a soft image is formed.
2. When a very close view is focused, spatial filtering is performed so that a sharp image is formed, and the level of UCR is intensified to improve the quality of the characters.

In FIG. 4, the focal length information Dis read by the film scanner 227 is input into the LUT 117. Color information COL to be developed in the printer 200 is also input into the LUT 117, and various signals (UCR signal, FILTER signal, and SEN signal) are generated, as shown in FIG. 8, based on the color information COL and the focal length information Dis.

Figure 8:
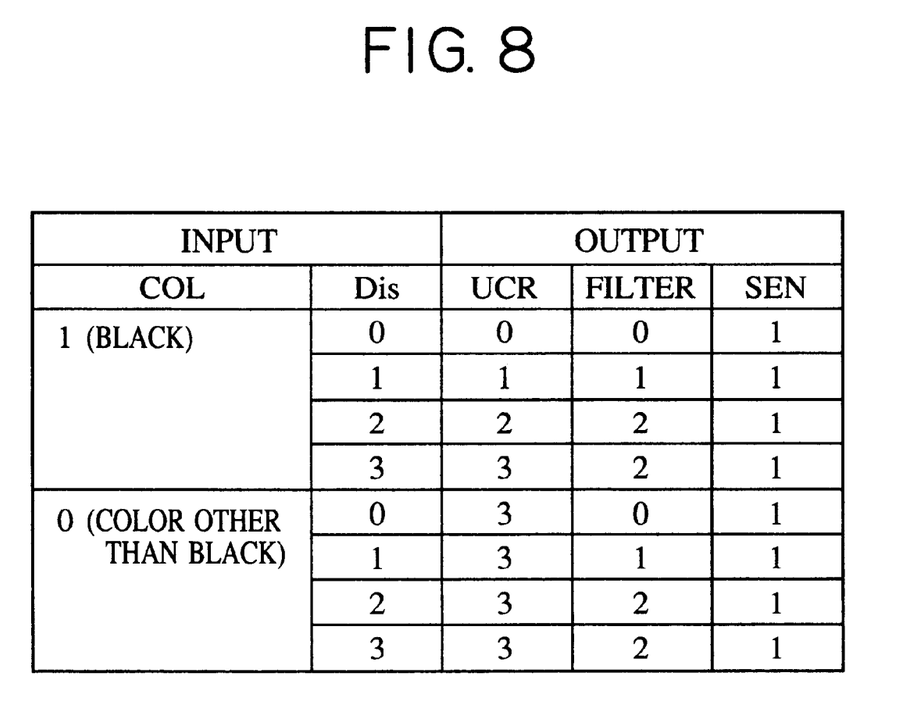
FIG. 8 illustrates the relationship between the input data and the output data in the look up table (LUT) shown in FIG. 4.

FIG. 8 illustrates the relationship between the input data and the output data in the LUT 117. The LUT 117 receives the focal length information Dis (two bits) read by the film scanner 227. The information Dis is defined as follows.

| | |
|---|---|
| Distant view: | 3 |
| Middle view: | 2 |
| Close view: | 1 |
| Very close view: | 0 |

The developing color COL indicating "1" represents a black color, while the developing color COL designating "0" represents a color other than black. Thus, by a combination of the color information COL and the focal length information Dis, the levels of the following types of signals are determined: the masking-coefficient control signal (UCR) to be input into the masking/UCR circuit 109, the output filter coefficient control signal (FILTER) to be input into the output filter 111, and the 400-line/200-line switching signal (SEN) input into the printer 200. The resulting signals are then output.

The UCR signal indicates the intensity level of the UCR operation: the intensity level decreases in the order of 0, 1, 2 and 3. The FILTER signal represents the enhancement level of an image edge: the edge enhancement decreases in the order of 0, 1, 2 and 3. The SEN signal "0" designates a 400-line signal, while the SEN signal "1" indicates a 200-line signal.

FIG. 8 shows that the LUT 117 sets the foregoing signals in the following manner when the image processing apparatus of this embodiment is under the standard condition.

1. UCR processing is performed with an increasingly intensified level as a closer view is focused (in case where the developing color is black).
2. The sharpness of an image (FILTER signal) is increased as a closer view is focused. The number of recording lines is set at 200 indicated by the SEN signal "1" unless otherwise instructed by the user through the operation section 1101. The masking/UCR processing circuit 109 generates a black signal K and performs masking according to the UCR control signal (UCR) output from the LUT 117.

The equations set out below illustrate masking/UCR equations performed in the masking/UCR processing circuit 109. The minimum value MIN (C, M, Y) of C1, M1 and Y1 is first obtained to determine a black signal K1 according to the equation (2101). Then, 4×8 masking is performed by using the equation (2102) so as to output C2, M2, Y2 and K2. In this equation (2102), the coefficients m11 through m84 indicate masking coefficients determined by the printer 200, while the coefficients k11 through k84 represent UCR coefficients determined by the UCR signal.

$$K_1 = -255 \times \log\left(\frac{\text{Min } CMY}{255}\right)\left(\frac{1}{1.52}\right) \quad (2101)$$

$$\begin{pmatrix} C2 \\ M2 \\ Y2 \\ K2 \end{pmatrix} = \begin{pmatrix} m11 \times k11 & m21 \times k21 & m31 \times k31 & m41 \times k41 & m51 \times k51 & m61 \times k61 & m71 \times k71 & m81 \times k81 \\ m12 \times k12 & m22 \times k22 & m32 \times k32 & m42 \times k42 & m52 \times k52 & m62 \times k62 & m72 \times k72 & m82 \times k82 \\ m13 \times k13 & m23 \times k23 & m33 \times k33 & m43 \times k43 & m53 \times k53 & m63 \times k63 & m73 \times k73 & m83 \times k83 \\ m14 \times k14 & m24 \times k24 & m34 \times k34 & m44 \times k44 & m54 \times k54 & m64 \times k64 & m74 \times k74 & m84 \times k84 \end{pmatrix} \begin{pmatrix} C1 \\ M1 \\ Y1 \\ K1 \\ C1M1 \\ M1Y1 \\ Y1C1 \\ K1K1 \end{pmatrix} \quad (2102)$$

In the spatial filter processing section (output filter) 111 shown in FIG. 4, two 5-pixel×5-pixel spatial filters are provided, and an output signal from one filter is connected to an input signal of the other filter. As the spatial filter coefficients, two types of smoothing (FILTER=3, 4) coefficients and two types of edge-enhancement (FILTER=0, 1) coefficients are provided and switched for each pixel in accordance with the level of the FILTER signal output from the LUT 117. Further, by virtue of the two spatial filters, an edge enhancement operation is performed after a smoothing operation. It is thus possible to achieve edge enhancement with a decreased level of Moire fringing and also to output an image of higher quality by a combination of the two types of edge enhancement coefficients.

Figure 9:
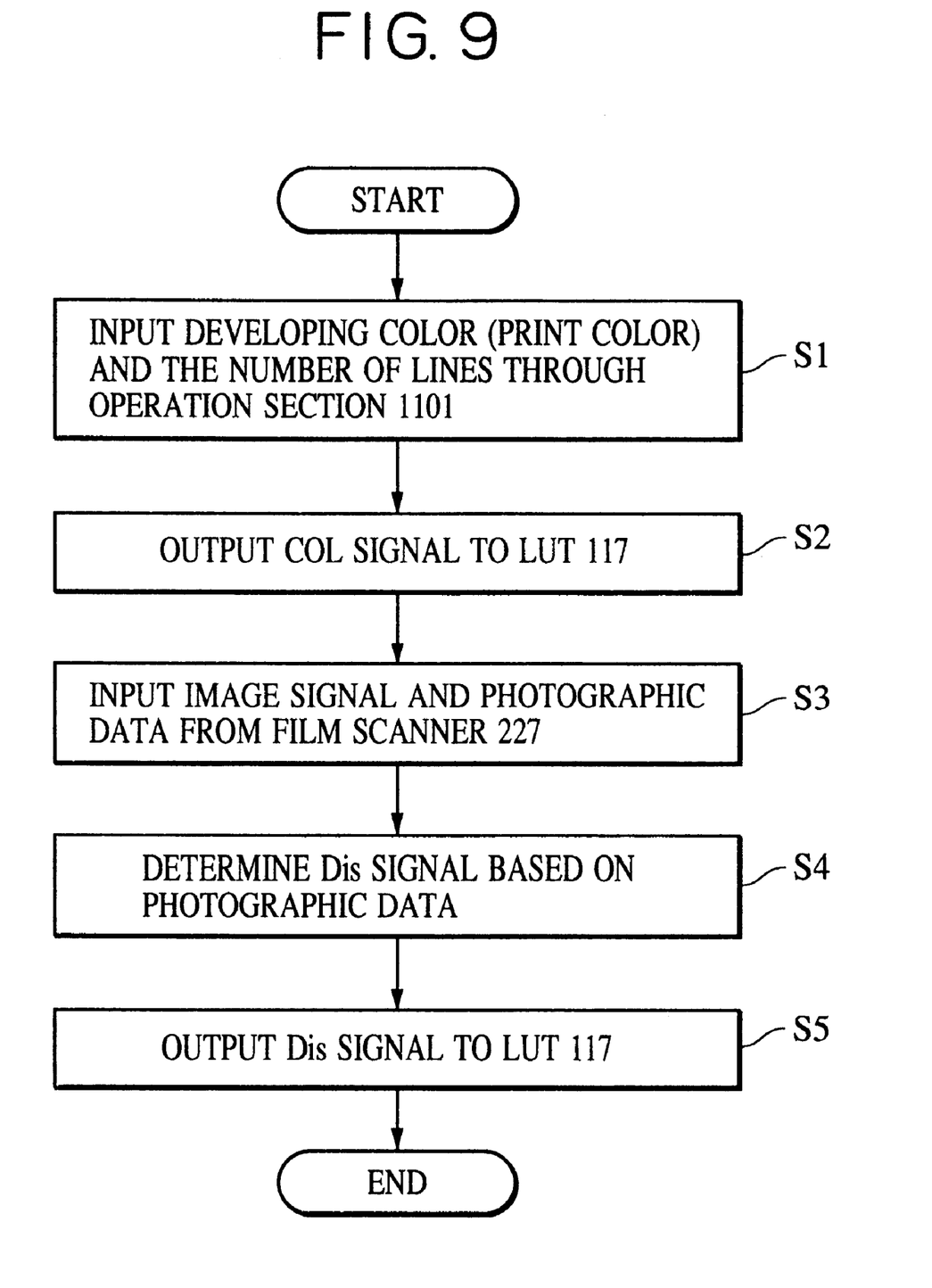
FIG. 9 is a flow chart illustrating the process used in the image processing unit shown in FIG. 4.

FIG. 9 is a flow chart illustrating the operation of generating a Dis signal indicating photographic information and a COL signal representing a developing color, the operation being performed by the CPU 1102 of the image signal processing unit 209 according to an embodiment of the present invention.

In step S1, the user inputs through the operation section 1101 the information representing a developing color (a color to be printed in the printer 200) and the number of lines for performing the PWM operation in the printer 200. If the input developing color is monochrome, the COL signal is determined to be "1". On the other hand, if the developing color is other than monochrome, the COL signal is determined to be "0". The determined COL signal is then output to the LUT 117 in step S2.

In step S3, an image signal is input from the film scanner 227. The image developed on the film 4 set in the film scanner 227 is read with the image scanner 7, and the photographic data magnetically recorded on the film 4 is further read by the magnetic head 1. Subsequently, in step S4, the level of the Dis signal is determined as discussed above based on the input photographic data, for example, the focal length of the image when the image has been taken. Then, the determined Dis signal is output to the LUT 117 in step S5. According to this procedure, the UCR coefficient used in the masking/UCR circuit 109, the type of the spatial filter used in the spatial filter circuit 111, and the number of lines used for the PWM processing in the printer 200 are determined. If it is found in step S1 that the 200-line mode (SEN=1) to be used in the printer 200 has been instructed, the CPU 1102 does not particularly perform any operation. In contrast, if the 400-line mode (SEN=0) has been instructed, the SEN signal is directly changed to "1" and is output to the printer 200. Alternatively, the information corresponding to "SEN=0" similar to the information shown in FIG. 8 is stored in the LUT 117, and the information is selected and directly output to the printer 200.

In the foregoing embodiment, UCR processing and filtering processing are modified based on photographic data (the focal length in this embodiment) recorded on the film. However, the auxiliary data used in the present invention is not restricted to photographic information, and magnetic information or information in the form of a bar code recorded on part of a document image may be read with the image scanner 201, and based on the read information, UCR processing or filtering processing may be performed on the document image. Moreover, the photographic data is not limited to the focal length, and various types of information concerning images may be used, or data which is directly usable for masking processing or UCR processing may be employed.

According to the foregoing embodiment, since the information is magnetically stored in a storage medium, the quality of a resulting image is not impaired. Also, the auxiliary data may be not only magnetically recorded, but may also be recorded by using a developer which may be only responsive to ultraviolet rays. The advantages offered by the present invention using a developer are similar to those exhibited by the present invention using the magnetically recorded information.

The present invention may be applied to a system consisting of a plurality of devices (for example, a host computer, an interface, a reader, and a printer) or to a single device (for example, a copying machine or a facsimile machine).

Further, the present invention may be achieved by the following modification. A storage medium on which a software program code for implementing the function of the foregoing embodiment is recorded may be installed in a system or a device, and the program code stored in the storage medium may be read and run by a computer (or its CPU or MPU) of the system or the device. In this case, the program code itself read from the storage medium achieves the function of the foregoing embodiment, and accordingly, the storage medium in which the program code is stored may form the present invention.

The storage mediums for storing the program code may include floppy disks, hard disks, optical disks, magneto-optical disks, CD-ROMs, CD-Rs, magnetic tape, non-volatile memory cards, and ROMs.

The invention also encompasses the cases where the function of the foregoing embodiment is achieved not only when the program code read from the storage medium is run by a computer, but also when an operating system (OS) run on the computer partially or wholly executes the corresponding processing in response to the instruction of the program code.

The invention further encompasses the following case. The program code read from a storage medium may be written into a storage device provided in an extended-function board inserted into a computer or an extended-function unit connected to a computer. Then, the CPU provided in the extended-function board or the extended-function unit may partially or wholly perform the corresponding processing in response to the instruction of the program code, thereby implementing the function of the foregoing embodiment.

As is seen from the foregoing description, the present invention offers the following advantages.

An image signal is optically recorded on a recording medium, and at the same time, the corresponding auxiliary information is magnetically recorded on the recording medium. Then, a method for image processing performed on the image signal read from the recording medium is suitably determined based on the auxiliary information. Thus, optimal image processing is performed on the image input from the recording medium.

Further, an image and the corresponding auxiliary information, such as focal length information, are recorded on a recording medium by different methods and are read therefrom. Based on the auxiliary information, the image is efficiently color-processed or filtered.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   first reading means for reading an image recorded on a recording medium using a first recording method;
   second reading means for reading focal length recorded on the recording medium using a second recording method which is different from the first recording method, the focal length being to an object in the image when the image is taken;
   digitizing means for digitizing the image read by said first reading means; and
   color-processing means for color-processing the image digitized by said digitizing means, in accordance with the focal length read by said second reading means.

2. An image processing apparatus according to claim 1, wherein the image is optically recorded on the recording medium.

3. An image processing apparatus according to claim 1, wherein the focus information is magnetically recorded on the recording medium.

4. An image processing apparatus according to claim 1, wherein the recording medium comprises a film used in a camera.

5. An image processing apparatus according to claim 1, wherein the color processing performed by said color-processing means comprises a masking or an under-color-removal processing.

6. An image processing apparatus according to claim 1, wherein the focus information comprises at least an aperture, a shutter speed, and a type of the recording medium, all of which concern the image when the image is taken.

7. An image processing method comprising:
   a first reading step of reading an image recorded on a recording medium using a first recording method;
   a second reading step of reading focal length recorded on the recording medium using a second recording method which is different from the first recording method, the focal length being to an object in the image when the image is taken;
   a digitizing step of digitizing the image read by said first reading step; and
   a color-precessing step of color-processing the image digitized by said digitizing step in accordance with the focal length read by said reading step.

8. A storage medium in which an image processing program is stored in such a manner that the program is readable by a computer, the program comprising:
   a first reading step of reading an image recorded on a recording medium using a first recording method;
   a second reading step of reading focal length recorded on the recording medium using a second recording method which is different from the first recording method, the focal length being to an object in the image when the image is taken;
   a digitizing step of digitizing the image read by said first reading step; and
   a color-processing step of color-processing the image digitized by said digitizing step in accordance with the focal length read in said second reading step.

9. An image processing apparatus comprising:
   first reading means for reading an image recorded on a recording medium using a first recording method;
   second reading means for reading focal length recorded on the recording medium using a second recording method which is different from the first recording method, the focal length being to an object in the image when the image is taken;
   digitizing means for digitizing the image read by said first reading means; and
   spatial filter-processing means for filter-processing the image digitized by said digitizing means, in accordance with the focal length read by said second reading means.

10. An image processing apparatus according to claim 9, wherein the image is optically recorded on the recording medium.

11. An image processing apparatus according to claim 9, wherein the focus information is magnetically recorded on the recording medium.

12. An image processing apparatus according to claim 9, wherein the recording medium comprises a film used in a camera.

13. An image processing apparatus according to claim 9, wherein the focus information comprises at least an aperture, a shutter speed, and a type of the recording medium, all of which concern the image when the image is taken.

14. An image processing apparatus according to claim 9, wherein the spatial filter-processing is edge-enhancement processing and/or smoothing filter-processing.

15. An image processing method comprising:
    a first reading step of reading an image recorded on a recording medium using a first recording method;
    a second reading step of reading focal length recorded on the recording medium using a second recording method which is different from the first recording method, the focal length being to an object in the image when the image is taken;
    a digitizing step of digitizing the image read by said first reading step; and
    a spatial filtering step of filtering an image digitized by said digitizing step, in accordance with the focal length read in said second reading step.

16. A storage medium in which an image processing program is stored in such a manner that the program is readable by a computer, the program comprising:
    a first reading step of reading an image recorded on a recording medium using a first recording method;
    a second reading step of reading focal length recorded on the recording medium using a second recording method which is different from the first recording method, the focal length being to an object in the image when the image is taken;
    a digitizing step of digitizing the image read by said first reading step; and
    a spatial filtering step of filtering the image digitized by said digitizing step, in accordance with the focal length read in said second reading step.

17. An image processing apparatus comprising:
    a first reader for reading an image recorded on a first area of a recording medium;
    a second reader for reading focal length recorded on a second area, different from said first area, of the recording medium, focal length being to an object in the image when the image is taken; and
    a color correcting unit for generating a black signal from a color signal of said image read out by said first reader according to the focal length read out by said second reader.

18. An image processing apparatus according to claim 17, further comprising print color setting means for setting a print color, wherein said color correcting means increases the intensity of the black signal in correspondence to reading-out a decreasing focal length by said reading-out means when a monochromatic print is set by said print color setting means.

19. An image processing means comprising:
a first reader for reading an image recorded on a first area of a recording medium;
a second reader for reading focal length recorded on a second area, different from said first area, of the recording medium, focal length being to an object in the image when the image is taken; and
an image forming unit for forming on an image holding body an image of the image read by said first reader, said image forming unit including a correcting unit for correcting so as to enhance black color of the formed image according to the focal length read by said second reader.

20. An image processing apparatus comprising:
reading-out means for reading out from a recording medium image information and focal length to an object included in the image information; and
a first reader for reading an image recorded on a first area of a recording medium;
a second reader for reading focal length recorded on a second area, different from said first area, of the recording medium, focal length being to an object in the image when the image is taken; and
a sharpness-correcting unit for correcting sharpness of an image according to the focal length read out by said second reader, and for increasing the sharpness of the image in correspondence to reading a decreasing focal length by said second reader.

21. An image processing apparatus comprising:
a first reader for reading an image recorded on a first area of a recording medium;
a second reader for reading focal length recorded on a second area, different from said first area, of the recording medium, focal length being to an object in the image when the image is taken; and
an image forming unit for forming an image on an image holding body of the image read out by said first reader,
wherein said image forming means includes a correcting unit for correcting so as to enhance sharpness of the formed image according to the focal length read out by said second readier.

22. An image processing method comprising:
a first reading step of reading an image recorded on a first area of recording medium;
a second reading step for reading focal length recorded on a second area, different from said first area, of the recording medium, focal length being to an object in the image when the image is taken; and
a color-correcting step of generating a black signal from a color signal of the image read by said first reading step according to the focal length read out by said second reading step, wherein intensity of the black signal is increased in correspondence to reading a decreasing focal length by said second reading step.

23. An image processing method according to claim 22, further comprising a print color setting step of setting a print color, wherein the intensity of the black signal is increased in correspondence to reading-out a decreasing focal length by said reading-out means when a monochromatic print is set in said print color setting step.

24. An image processing method comprising:
a first reading step of reading an image recorded on a first area of a recording medium;
a second reading step of reading a focal length recorded on a second area, different from said first area, of the recording medium, focal length being to an object in the image when the image is taken; and
an image forming step of forming an image on an image holding body of the image read out in said first reading step,
wherein said image forming step includes a correcting step of correcting so as to enhance a black color of the formed image according to the focal length read in said second reading step.

25. An image processing method comprising:
a first reading step of reading an image recorded on a first area of a recording medium;
a second reading step of reading a focal length recorded on a second area, different from said first area, of the recording medium, focal length being to an object in the image when the image is taken; and
a sharpness-correcting step of correcting sharpness of an image according to the focal length read out in said second reading step, wherein the sharpness of the image is increased in correspondence to reading-out a decreasing focal length by said second reading step.

26. An image processing method comprising:
a first reading step of reading an image recorded on a first area of a recording medium;
a second reading step of reading a focal length recorded on a second area, different from said first area, of the recording medium, focal length being to an object in the image when the image is taken; and
an image forming step of forming an image on an image holding body of the image read out in said first reading step,
wherein said image forming step includes a correcting step of correcting so as to enhance sharpness of the formed image according to the focal length read out by said second reading step.

* * * * *

UNITED STATES PATENT AND TRADEMARK OFFICE
CERTIFICATE OF CORRECTION

PATENT NO. : 6,343,144 B2
DATED : January 29, 2002
INVENTOR(S) : Yoshiki Uchida

It is certified that error appears in the above-identified patent and that said Letters Patent is hereby corrected as shown below:

<u>Column 3,</u>
Line 43, "placable" should read -- placeable --; and
Line 52, "direction)," should read -- direction"), --.

<u>Column 4,</u>
Line 47, "the-printer" should read -- the printer --.

<u>Column 15,</u>
Line 48, "readier." should read -- reader. --.

Signed and Sealed this

First Day of July, 2003

JAMES E. ROGAN
*Director of the United States Patent and Trademark Office*